United States Patent
Suzuki et al.

(10) Patent No.: US 9,030,146 B2
(45) Date of Patent: May 12, 2015

(54) DRIVING APPARATUS AND MOTOR (71) Applicant: Rohm Co., Ltd., Kyoto (JP)

(72) Inventors: Toshiya Suzuki, Kyoto (JP); Shinsuke Sano, Kyoto (JP)

(73) Assignee: Rohm Co., Ltd. (JP)

( * ) Notice: Subject to any disclaimer, the term of this patent is extended or adjusted under 35 U.S.C. 154(b) by 93 days.

(21) Appl. No.: 13/950,816

(22) Filed: Jul. 25, 2013

(65) Prior Publication Data

US 2014/0028236 A1   Jan. 30, 2014

(30) Foreign Application Priority Data

Jul. 27, 2012 (JP) .................................. 2012-167741

(51) Int. Cl.
*H02P 23/00* (2006.01)
*H02P 6/18* (2006.01)

(52) U.S. Cl.
CPC ................ *H02P 23/00* (2013.01); *H02P 6/182* (2013.01); *H02P 6/187* (2013.01)

(58) Field of Classification Search
USPC ............ 318/503, 254, 561, 432; 417/2, 44.11
See application file for complete search history.

(56) References Cited

U.S. PATENT DOCUMENTS

| | | | |
|---|---|---|---|
| 6,281,650 B1 * | 8/2001 | Yutkowitz | 318/561 |
| 6,428,282 B1 * | 8/2002 | Langley | 417/2 |
| 6,456,946 B1 * | 9/2002 | O'Gorman | 702/58 |
| 6,898,046 B2 * | 5/2005 | Sri-Jayantha et al. | 360/77.02 |
| 7,267,531 B2 * | 9/2007 | Anderson et al. | 417/44.11 |
| 7,288,956 B2 * | 10/2007 | De Cock et al. | 324/765.01 |
| 7,728,540 B2 * | 6/2010 | Sugie | 318/432 |
| 2003/0218822 A1 * | 11/2003 | Sri-Jayantha et al. | 360/77.02 |
| 2004/0222779 A1 * | 11/2004 | Cock et al. | 324/76.77 |
| 2005/0074337 A1 * | 4/2005 | Anderson et al. | 417/44.11 |
| 2008/0247734 A1 * | 10/2008 | Sugie | 388/811 |
| 2012/0039376 A1 * | 2/2012 | Latham et al. | 375/224 |
| 2012/0076343 A1 * | 3/2012 | Arai | 381/400 |
| 2012/0161687 A1 * | 6/2012 | Arai et al. | 318/619 |

FOREIGN PATENT DOCUMENTS

JP    07031190 A    1/1995
JP    2001284868 A    10/2001

* cited by examiner

*Primary Examiner* — Paul Ip
(74) *Attorney, Agent, or Firm* — Cantor Colburn LLP (57) ABSTRACT

A digital filter is configured to convert, into a digital value, the duty ratio of a control signal subjected to pulse width modulation according to a target toque to be set for a fan motor to be driven. A sampling circuit is configured to perform sampling of the output value of the digital filter at a sampling timing that is asynchronous with respect to the cycle of the control signal, so as to generate a torque instruction value. A driving circuit is configured to drive the fan motor according to the torque instruction value thus generated.

14 Claims, 7 Drawing Sheets

DRIVING APPARATUS AND MOTOR

The present invention claims priority under 35 U.S.C. §119 to Japanese Application No. 2012-167741 filed Jul. 27, 2012, the entire content of which is incorporated herein by reference.

BACKGROUND OF THE INVENTION

1. Field of the Invention

The present invention relates to a fan motor driving technique.

2. Description of the Related Art

In recent years, increase in the operation speed of personal computers and workstations has led to rapid increase in the operation speeds of computation LSIs (Large Scale Integrated Circuit) such as CPUs (Central Processing Unit), DSPs (Digital Signal Processor), etc. Such LSIs have a problem in that an increase in the operation speed, i.e., an increase in clock frequency involves an increase in heat generation. The heat generation of the LSI leads to thermal runaway of the LSI itself, or affects its peripheral circuits, which becomes a problem. Accordingly, such a situation requires a suitable thermal cooling operation for a heated component such as an LSI (which will be referred to as the "LSI" hereafter) as a crucial technique.

Examples of techniques for cooling an LSI includes an air-cooling cooling method employing a cooling fan. In this method, for example, a cooling fan is arranged such that it faces the surface of the LSI, and cool air is blown onto the surface of the LSI using the cooling fan.

The related conventional techniques are disclosed in Japanese Patent Application Laid Open No. H07-31190 and Japanese Patent Application Laid Open No. 2001-284868, for example.

Figure 1:
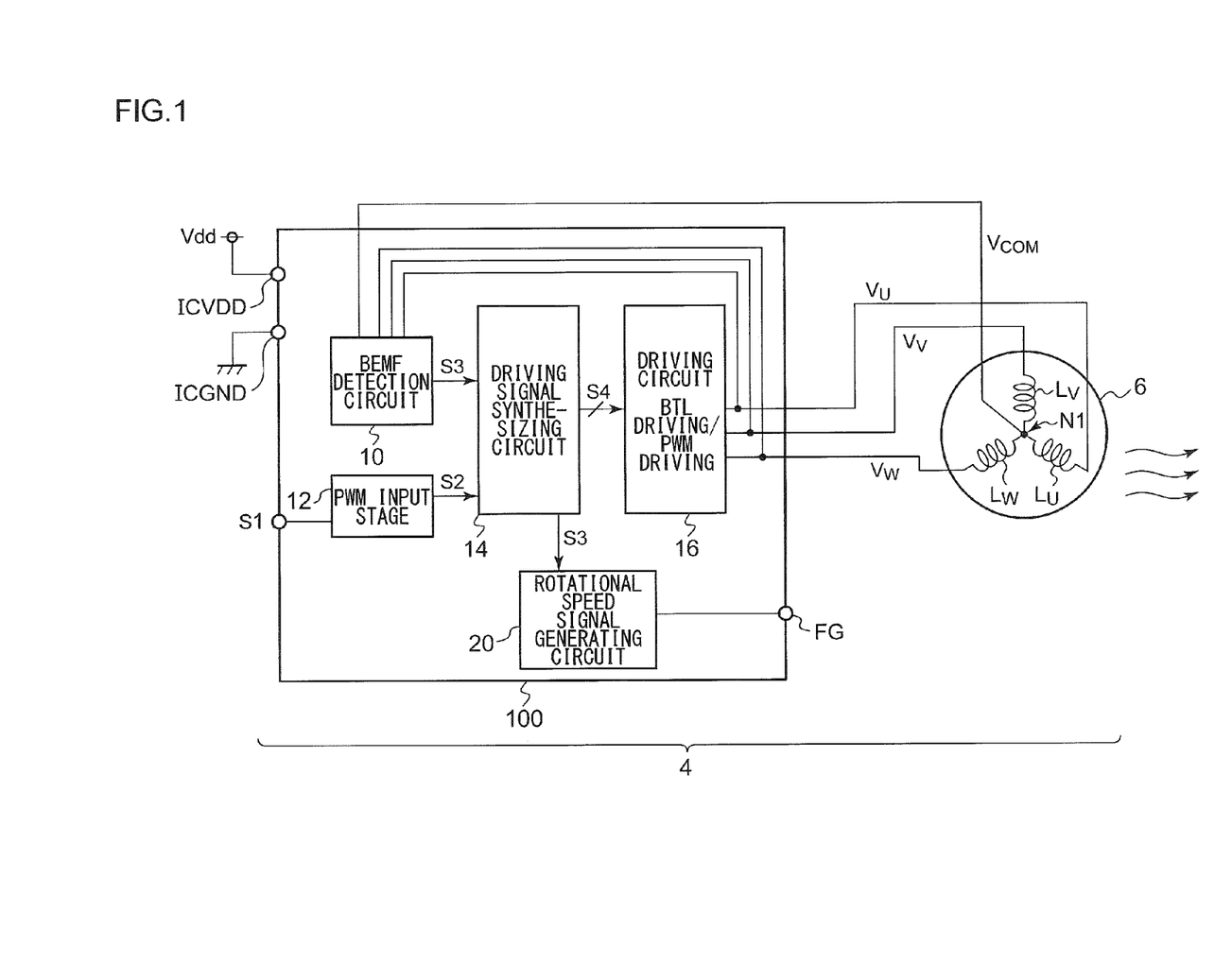
FIG. 1 is a circuit diagram showing a configuration of a cooling apparatus investigated by the present inventors.

FIG. 1 is a circuit diagram showing a configuration of a cooling apparatus investigated by the present inventors. A cooling apparatus 4 includes a driving apparatus 100 and a fan motor 6. The driving apparatus 100 is configured to drive the fan motor 6 according to a control signal S1 which indicates a torque (rotational speed) to be set for the fan motor 6.

The fan motor 6 is configured as a three-phase AC motor including a U-phase coil $L_U$, a V-phase coil $L_V$, and an W-phase coil $L_W$, which are connected in a star winding, and an unshown permanent magnet. The driving apparatus 100 is configured as a function IC (Integrated Circuit) integrated on a single semiconductor substrate. The driving apparatus 100 is arranged such that a power supply voltage is supplied to its power supply terminal ICVDD, and a ground voltage is supplied to its ground terminal ICGND.

The driving apparatus 100 includes a back electromotive force (BEMF) detection circuit 10, a PWM input stage 12, a driving signal synthesizing circuit 14, a driving circuit 16, and a rotational speed signal generating circuit 20.

The PWM input stage 12 is configured to receive, as an input signal, the control signal S1 subjected to pulse width modulation according to the target torque of the fan motor 6, i.e., according to the target rotational speed thereof. When the maximum torque is indicated, the duty ratio of the control signal S1 becomes 100%. When the minimum torque (zero torque) is indicated, the duty ratio of the control signal S1 becomes 0%. The PWM input stage 12 is configured to perform duty ratio digital conversion so as to generate a torque instruction value S2 in the form of digital data that corresponds to the duty ratio of the control signal S1.

The BEMF detection circuit 10 is configured to compare each of the back electromotive force voltages $V_U$, $V_V$, and $V_W$ which develop at the respective terminals of the U-phase coil $L_U$, V-phase coil $L_V$, and W-phase coil $L_W$, with an intermediate-point voltage $V_{COM}$ that develops at a common connection node N1 that connects these three coils, and to generate a rotation detection signal S3 which is asserted for every electrical angle of 60 degrees. For example, the BEMF detection circuit 10 includes comparators (not shown) respectively provided to the U-phase coil, V-phase coil, and W-phase coil. Each comparator is configured to compare the coil voltage (back electromotive force voltage) $V_U$, $V_V$, or $V_W$ that occurs at one terminal of the corresponding phase coil with the intermediate-point voltage $V_{COM}$, and to generate a signal which indicates the comparison result. By logically combining the signals output from the respective phase comparators, such an arrangement generates the rotation detection signal S3.

The driving signal synthesizing circuit 14 is configured to receive the rotation detection signal S3 and the torque instruction value S2, and to combine the signals thus received so as to generate a driving control signal S4. Furthermore, immediately after the driving apparatus 100 is powered on, the driving signal synthesizing circuit 14 is configured to switch the driving sequence for the fan motor 6.

The driving circuit 16 is configured to apply a driving voltage to one terminal of each of the coils $L_U$, $L_V$, and $L_W$, according to the driving control signal S4. The driving circuit 16 may be configured to BTL drive the fan motor 6, or may be configured to PWM drive the fan motor 6 according to the control signal S1.

The rotational speed signal generating circuit 20 is configured to generate a rotational speed signal FG that transits with every mechanical angle (motor angle) of 180 degrees with respect to the fan motor 6, i.e., every time the fan motor 6 rotates a half-turn, and to output the rotational speed signal FG thus generated via an FG terminal.

Figure 2A:
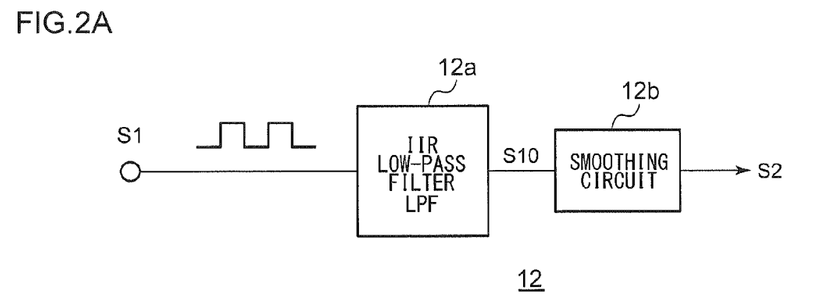
FIG. 2A is a circuit diagram showing an example configuration of a PWM input stage investigated by the present inventors.
Figure 2B:
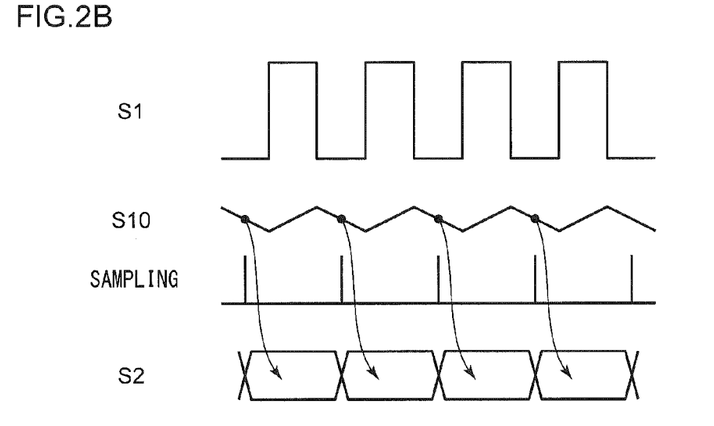
FIG. 2B is a waveform diagram showing the operation thereof.

FIG. 2A is a circuit diagram showing an example configuration of the PWM input stage 12 investigated by the present inventors. FIG. 2B is a waveform diagram showing the operation thereof. The PWM input stage 12 shown in FIG. 2A includes a low-pass filter 12a and a smoothing circuit 12b. The low-pass filter 12a is configured as an IIR (Infinite Impulse Response) low-pass filter, for example. The smoothing circuit 12b is configured to perform sampling of a digital output value S10, which is an output signal of the low-pass filter 12a, with a sampling frequency that is the same as that of the control signal S1, so as to update the torque instruction value S2. It should be noted that the configuration and the operation of the PWM input stage 12 shown in FIG. 2 should by no means be recognized as known techniques.

With the PWM input stage 12 shown in FIG. 2A, when the duty ratio of the control signal S1 is maintained at a constant value, the torque instruction value S2 is also maintained at a constant value. Such an arrangement has an advantage of providing the electric motor with a stable torque. However, such an arrangement has a problem in that acoustic noise generated by the motor occurs at a particular frequency in a concentrated manner. There is a demand for providing a silent fan motor. Thus, such a problem must be solved.

SUMMARY OF THE INVENTION

The present invention has been made in view of such a situation. Accordingly, it is an exemplary purpose of an embodiment of the present invention to provide a driving apparatus which is capable of reducing the noise of a fan motor.

An embodiment of the present invention relates to a driving apparatus for a fan motor. The driving apparatus comprises: a digital filter configured to convert, into a digital value, a duty ratio of a control signal which is pulse width modulated according to a target torque to be set for a fan motor to be driven; a sampling circuit configured to perform sampling of an output value of the digital filter at a sampling timing that is asynchronous with respect to a cycle of the control signal, so as to generate a torque instruction value; and a driving circuit configured to drive the fan motor according to the torque instruction value.

With such an embodiment, the output value of the digital filter is sampled at a sampling timing that is asynchronous with respect to the cycle of the control signal. Thus, even if the duty ratio of the control signal is continuously maintained at a constant value, the torque instruction value fluctuates randomly. Such an arrangement is capable of dispersing the frequency of the acoustic noise.

In one embodiment, a timing at which the sampling circuit updates the torque instruction value may correspond to a zero-crossing point of the fan motor. By updating the torque instruction value at each zero-crossing point, such an arrangement is capable of suppressing noise that accompanies the switching of the torque.

In one embodiment, when the sampling circuit performs sampling of the output value of the digital filter, the sampling circuit may be configured to immediately update the torque instruction value. That is to say, the sampling timing and the update timing may match each other. In this case, such an arrangement allows the signal processing and the circuit configuration to be configured in a simple manner.

In one embodiment, the sampling circuit may be configured to perform sampling of the output value of the digital filter according to a zero-crossing point of the fan motor, so as to update the torque instruction value.

In one embodiment, the sampling circuit may be configured to perform sampling of the output value of the digital filter for every predetermined electrical angle, so as to update the torque instruction value. The predetermined electrical angle may be set to 360 degrees.

With such a fan motor, the driving current becomes zero for every predetermined electrical angle. Thus, by updating the torque instruction value in synchronization with the rotation of the fan motor, such an arrangement is capable of suppressing the occurrence of noise that accompanies the switching of the torque.

In one embodiment, the sampling timing at which the output value of the digital filter is sampled may differ from an update timing at which the torque instruction value is updated.

Another embodiment of the present invention relates to a cooling apparatus. The cooling apparatus comprises: a fan motor; and the aforementioned motor driving apparatus configured to drive the fan motor.

Another embodiment of the present invention relates to an electronic device. The electronic device may comprise the cooling apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Description will be made regarding an embodiment of the present invention with reference to a fan motor driving apparatus mounted on an electronic computer such as a personal computer, workstation, or the like, and configured to cool a CPU or the like, for exemplary purposes.

Figure 3:
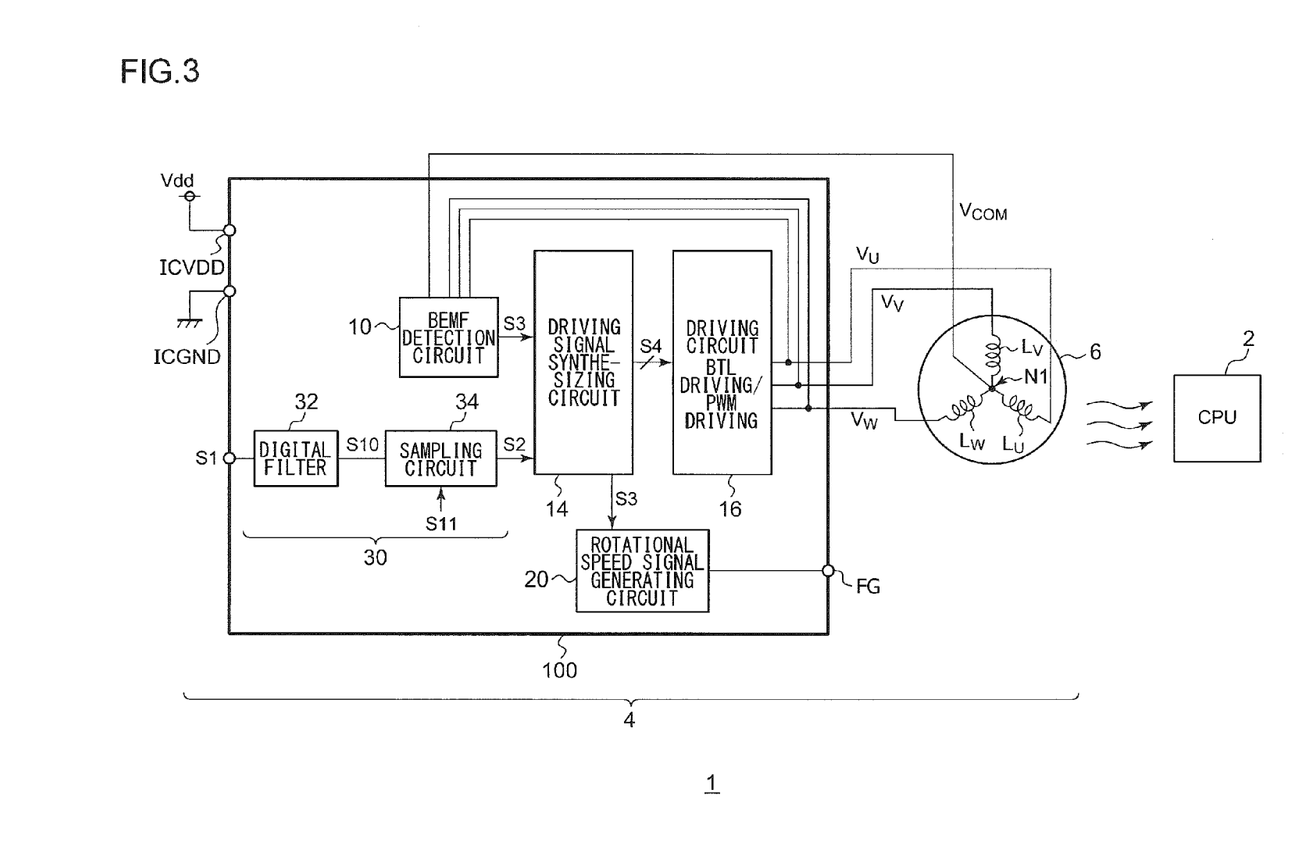
FIG. 3 is a block diagram showing a configuration of an electronic device including a driving apparatus according to an embodiment.

FIG. 3 is a block diagram showing a configuration of an electronic device 1 including a driving apparatus 100 according to an embodiment.

The electronic device 1 is configured as a computer such as a desktop personal computer, laptop personal computer, workstation, or the like, or otherwise a consumer electronics device such as a refrigerator, TV, or the like. The electronic device 1 includes a component to be cooled, e.g., a CPU 2. A cooling apparatus 4 is configured to cool the CPU 2 by blowing air.

The cooling apparatus 4 includes the driving apparatus 100 and a fan motor 6. The fan motor 6 is arranged in the vicinity of the CPU 2 to be cooled. The driving apparatus 100 is configured to drive the fan motor 6 according to a control signal S1 which indicates the torque (rotational speed) of the fan motor 6. The cooling apparatus 4 is commercially available in the form of a module.

The fan motor 6 is configured as a three-phase AC motor, and includes a U-phase coil $L_U$, a V-phase coil $L_V$, and an W-phase coil $L_W$, which are connected in a star winding, and an unshown permanent magnet. Description will be made regarding an arrangement in which the fan motor 6 is configured to have four poles.

The driving apparatus 100 is configured as a function IC (Integrated Circuit) integrated on a single semiconductor substrate. The driving apparatus 100 is arranged such that a power supply voltage is supplied to its power supply terminal ICVDD, and a ground voltage is supplied to its ground terminal ICGND.

The driving apparatus 100 includes a back electromotive force (BEMF) detection circuit 10, a PWM input stage 12, a driving signal synthesizing circuit 14, a driving circuit 16, and a rotational speed signal generating circuit 20. The driving apparatus 100 has the same configuration as that described with reference to FIG. 1.

The PWM input stage 30 is configured to receive, as an input signal, the control signal S1 subjected to pulse width modulation according to the target torque of the fan motor 6, i.e., according to the target rotational speed thereof. When the maximum torque is indicated, the duty ratio of the control signal S1 becomes 100%. When the minimum torque (zero torque) is indicated, the duty ratio of the control signal S1 becomes 0%. The PWM input stage 12 is configured to perform duty ratio digital conversion so as to generate a torque instruction value S2 in the form of digital data that corresponds to the duty ratio of the control signal S1.

The PWM input stage 30 includes a digital filter 32 and a sampling circuit 34. The digital filter 32 is configured to receive the control signal S1 subjected to pulse width modulation according to the target torque of the fan motor 6, and to convert the duty ratio of the control signal S1 thus received into a digital value. The digital filter 32 is configured as an IIR (Infinite Impulse Response) digital filter, for example.

The sampling circuit 34 is configured to perform sampling of the output value S10 of the digital filter 32 at a sampling timing that corresponds to a strobe signal S11 configured as a signal that is asynchronous with respect to the cycle of the control signal S1, so as to generate a torque instruction value S2.

According to a rotation detection signal S3 output from the BEMF detection circuit 10 and the torque instruction value S2 received from the PWM input stage 30, the driving signal synthesizing circuit 14 is configured to generate a driving control signal S4 for driving the fan motor 6.

The driving circuit 16 is configured to apply a driving voltage to one terminal of each of the coils $L_U$, $L_V$, and $L_W$, according to the driving control signal S4. The driving circuit 16 may be configured to BTL drive the fan motor 6, or may be configured to PWM drive the fan motor 6 according to the control signal S1.

The rotational speed signal generating circuit 20 is configured to generate a rotational speed signal FG that transits with every mechanical angle (motor angle) of 360 degrees with respect to the fan motor 6, i.e., every time the fan motor 6 rotates a half-turn, and to output the rotational speed signal FG thus generated via an FG terminal.

Figure 4:
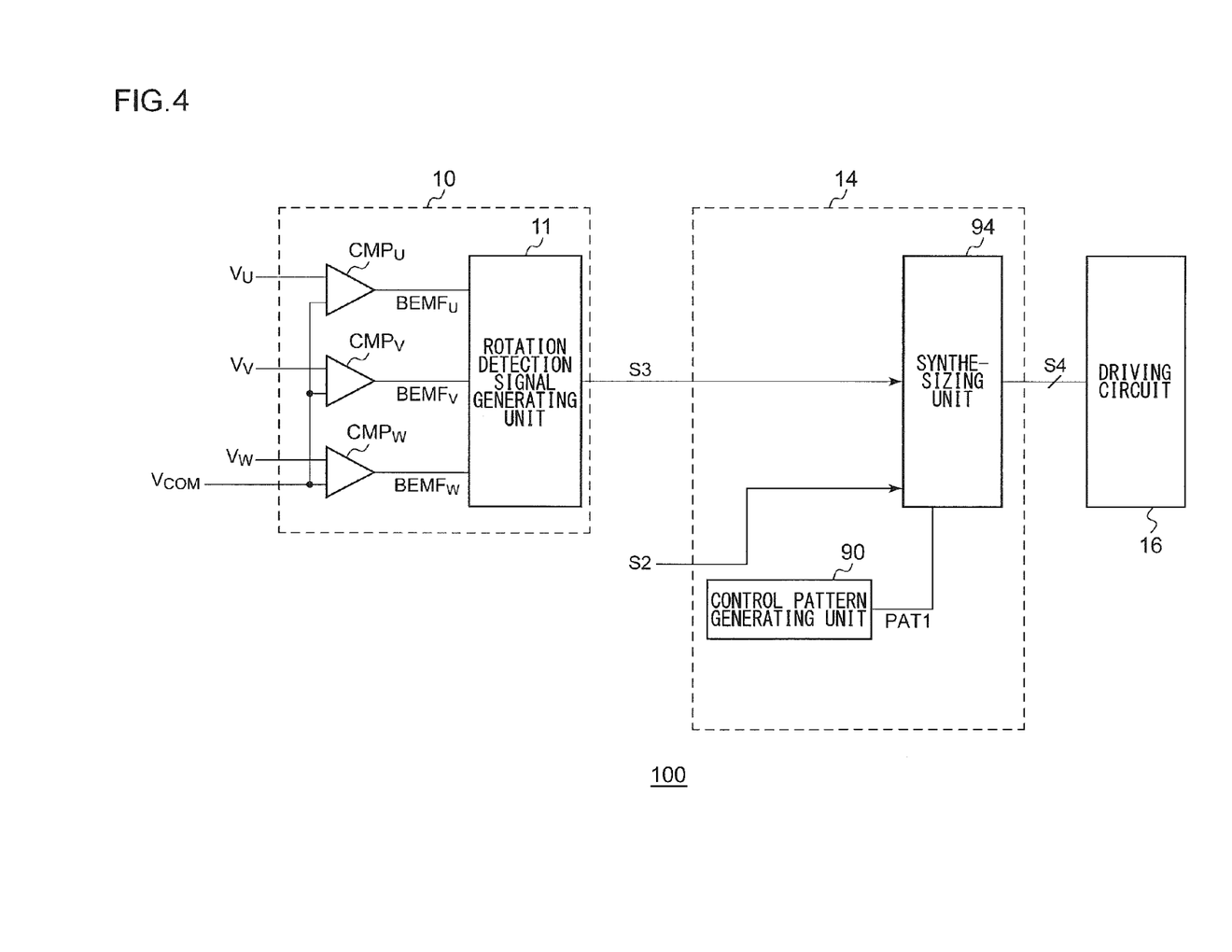
FIG. 4 is a circuit diagram showing a specific example configuration of the driving apparatus shown in FIG. 3.

FIG. 4 is a circuit diagram showing a specific example configuration of the driving apparatus 100 shown in FIG. 3.

The BEMF detection circuit 10 includes multiple comparators $CMP_U$ through $CMP_W$, and a rotation detection signal generating unit 11. The multiple comparators $CMP_U$ through $CMP_W$ are provided to the respective coils $L_U$ through $L_W$ of the fan motor 6. The comparators $CMP_U$ through $CMP_W$ are configured to compare the back electromotive force voltages $V_U$ through $V_W$ that occur at one terminal of the respective corresponding phase coils $L_U$ through $L_W$ with the intermediate-point voltage $V_{COM}$ that develops at a connection node that connects the multiple coils $L_U$ through $L_W$, and to generate back electromotive force voltage detection signals $BEMF_U$ through $BEMF_W$ (hereafter referred to as "detection signals") which indicate the comparison result.

The timing at which each of the back electromotive force voltages $V_U$ through $V_W$ for the respective phases crosses the intermediate-point voltage $V_{COM}$, i.e., the transition timing of each of the back electromotive force voltage detection signals $BEMF_U$ through $BEMF_W$, will be referred to as the "zero-crossing point".

The rotation detection signal generating unit 11 is configured to receive the detection signals $BEMF_U$ through $BEMF_W$ for the respective phases, and to logically combine the detection signals thus received so as to generate a rotation detection signal S3. The rotation detection signal generating unit 11 may be configured as part of a synthesizing unit 94.

The driving signal synthesizing circuit 14 includes a control pattern generating unit 90 and the synthesizing unit 94.

When the fan motor 6 is to be rotationally driven in a first direction, the control pattern generating unit 90 is configured to output a control pattern PAT1 which defines a driving sequence for the driving circuit 16. In a case in which the fan motor 6 is capable of switching the rotation direction between a forward rotation direction and a reverse rotation direction, two control patterns are prepared according to the rotation directions that can be switched.

The control pattern PAT1 includes data which specifies a sequence in which a signal is to be supplied to each of the U-phase coil $L_U$, V-phase coil $L_V$, and W-phase coil $L_W$ of the fan motor 6. The control pattern PAT1 may be stored in ROM or the like. The synthesizing unit 94 is configured to read out the first control pattern PAT1 in synchronization with the rotation detection signal S3.

The synthesizing unit 94 is configured to generate the driving control signal S4 according to the control pattern PAT1 in synchronization with the output signals of the multiple comparators $CMP_U$ through $CMP_W$, i.e., in synchronization with the rotation detection signal S3.

In a case in which the driving circuit 16 is configured to perform a PWM driving operation (switching driving operation), such an arrangement is configured to switch the driving voltages applied to the coils $L_U$ through $L_W$ of the fan motor 6 between a high level voltage (power supply voltage) and a low level voltage (ground voltage). The synthesizing unit 94 is configured to receive the torque instruction value S2 from the PWM input stage 12, and to generate a pulse width modulation signal having a duty ratio that corresponds to the torque instruction value S2. Furthermore, the synthesizing unit 94 is configured to logically combine the pulse width modulation signal thus generated with the control pattern PAT1, so as to generate the driving control signal S4. It should be noted that the configuration of the synthesizing unit 94 is not restricted in particular. Rather, the synthesizing unit 94 may preferably be configured using known techniques.

The driving circuit 16 may be configured to perform a BTL driving operation (linear driving operation). With such a BTL driving operation, the driving voltage applied to each of the coils $L_U$ through $L_W$ of the fan motor 6 is configured to have an envelope waveform that changes according to a sine waveform, a quasi-sine waveform, a trapezoidal waveform, or the like. In the BTL driving operation, such an arrangement is configured to generate a pulse width modulation signal having a duty ratio that corresponds to the torque instruction value S2 received from the PWM input stage 12, and to combine the pulse width modulation signal thus generated with the envelope waveform so as to generate the driving voltage.

Figure 5:
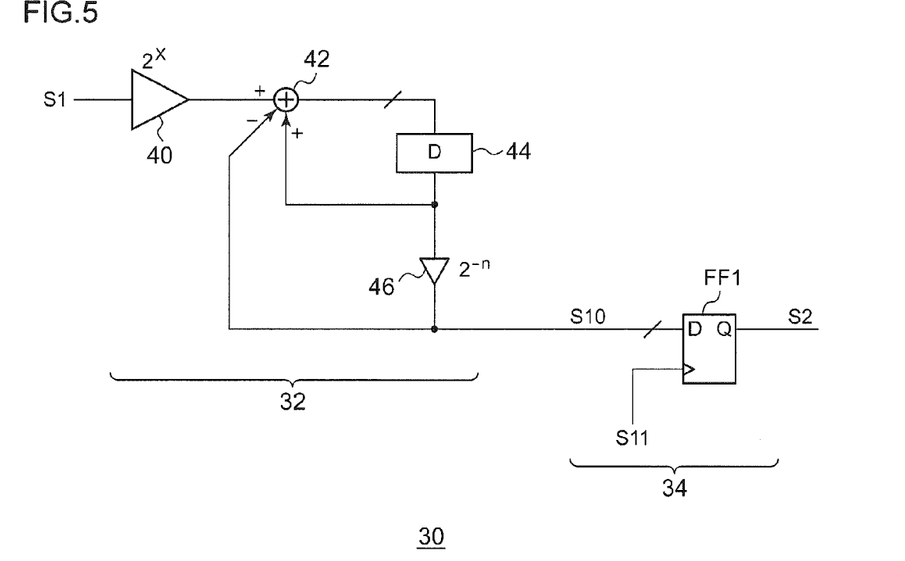
FIG. 5 is a block diagram showing a specific example configuration of the PWM input stage.

FIG. 5 is a block diagram showing a specific example configuration of the PWM input stage 30. The PWM input stage 30 includes the digital filter 32 and the sampling circuit 34.

The digital filter 32 is configured to receive the control signal S1 subjected to pulse width modulation according to the target torque of the fan motor 6, and to convert the duty ratio of the control signal S1 thus received into a digital value. The digital filter 32 is configured as an IIR (Infinite Impulse Response) digital filter, for example. The digital filter 32 includes a first converter 40, an adder 42, a delay circuit 44, and a coefficient circuit 46.

The duty ratio is detected in the form of $2^x$-level data. The first converter 40 is configured to output a digital value of $2^x$ when the control signal S1 is high level, and to output a digital value of 0 when the control signal S1 is low level. Here, in a case in which x=9, the duty ratio is converted to 512-level data. In this case, the value of the output of the first converter 40 is 512 or 0 in decimal notation. The adder 42 is configured to generate the sum of the output of the first converter 40 and the output of the delay circuit 44. Furthermore, the adder 42 is configured to subtract the output of the coefficient circuit 46 from the sum thus generated. The delay circuit 44 is configured to delay the output of the adder 42 by n bits. The coefficient circuit 46 is configured to multiply the output of the delay circuit 44 by a coefficient $2^{-n}$. Here, $2^{-n}$ is a coefficient of the filter. The output S10 of the coefficient circuit 46 is input to the sampling circuit 34 arranged as a downstream circuit.

It should be noted that the configuration of the digital filter 32 is not restricted to such an arrangement shown in FIG. 3. Rather, various kinds of other digital filters may be employed. For example, a second order filter or a higher-order filter may be employed. Also, an FIR (Finite Impulse Response) filter may be employed.

The sampling circuit 34 is configured to perform sampling of the output value S10 of the digital filter 32 at a sampling timing that corresponds to the strobe signal S11 which is asynchronous with respect to the cycle of the control signal S1, so as to generate the torque instruction value S2. Specifically, the sampling circuit 34 may be configured as a flip-flop FF1 or a latch circuit.

With the present embodiment, when the sampling circuit 34 performs sampling of the output S10 of the digital filter 32, the torque instruction value S2, which is input to the driving signal synthesizing circuit 14 arranged as a downstream circuit, is immediately updated. That is to say, the sampling timing t1 is substantially the same as the update timing t2. However, with the present embodiment, the sampling timing t1 and the update timing t2 are defined independently.

Preferably, as described above, the sampling timing t1 is generated asynchronously with respect to the switching cycle of the control signal S1. Furthermore, the update timing t2 is preferably generated for every predetermined electrical angle according to the zero-crossing point of the fan motor 6. As described above, the zero-crossing point can be detected by means of the BEMF detection circuit 10. The update timing t2 is generated for every electrical angle of 360 degrees, for example. For example, in a case of employing a four-pole electric motor, the update timing t2 is generated for every half-turn of the rotor. Also, in a case of employing a 12-pole electric motor, the update timing t2 is generated for every ⅙-turn of the rotor. The update timing can be generated according to each edge of the rotation detection signal S3 or otherwise according to each edge of the rotational speed signal FG.

In a case in which the sampling timing t1 matches the update timing t2, these timings are preferably configured asynchronously with respect to the cycle of the control signal S1, and are preferably configured according to the zero-crossing point of the fan motor 6. The edge of the rotation detection signal S3 or the edge of the rotational speed signal FG occurs at a cycle that corresponds to the rotational speed of the fan motor 6, i.e., is configured as a signal that is asynchronous with respect to the cycle of the control signal S1. Thus, the timing that corresponds to the zero-crossing point may be employed as the sampling point t1 as well as being employed as the update timing t2.

With the sampling circuit 34 shown in FIG. 5, the strobe signal S11 is asserted for every predetermined electrical angle of the fan motor 6. At this timing, the output value S10 of the digital filter 32 is sampled, and the torque instruction signal S2 is updated.

The above is the configuration of the driving apparatus 100. Next, description will be made regarding the operation thereof.

Figure 6:
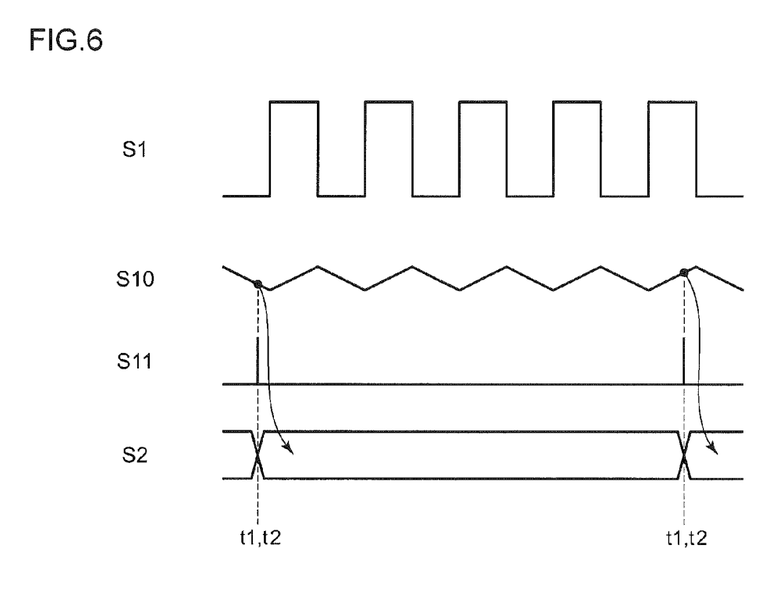
FIG. 6 is a waveform diagram showing the operation of the driving apparatus shown in FIG. 3.

FIG. 6 is a waveform diagram showing the operation of the driving apparatus 100 shown in FIG. 3. The strobe signal S11, which indicates the sampling timing t1 and the update timing t2, is generated according to the zero-crossing point. The zero-crossing point is generated asynchronously with respect to the cycle of the control signal S1. Thus, even if the output S10 of the digital filter 32 fluctuates in a cyclic manner, the value of the output S10 of the digital filter 32 at the sampling timing t1, i.e., the torque instruction value S2, fluctuates randomly in each cycle.

With the driving apparatus 100, even if the duty ratio of the control signal S1 is maintained at a constant value, the torque instruction value S2 fluctuates. Thus, such an arrangement is capable of dispersing the frequency component of the acoustic noise that occurs in the fan motor 6, thereby reducing the acoustic noise.

Furthermore, by updating the torque instruction signal S2 at the update timing t2 that matches the zero-crossing point, such an arrangement suppresses distortion of the current waveform, thereby suppressing the occurrence of noise.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

The sampling timing t1 at which the sampling circuit 34 performs sampling of the output value S10 of the digital filter 32 may differ from the update timing t2 at which the torque instruction value S2 to be input to the driving signal synthesizing circuit 14 is updated.

With such an arrangement, the sampling circuit 34 may preferably have a configuration including two flip-flops connected in series arranged such that a strobe signal which indicates the sampling timing t1 is input to the first-stage flip-flop, and a strobe signal which indicates the update timing t2 is input to the second-stage flip-flop.

Second Modification

Figure 7:
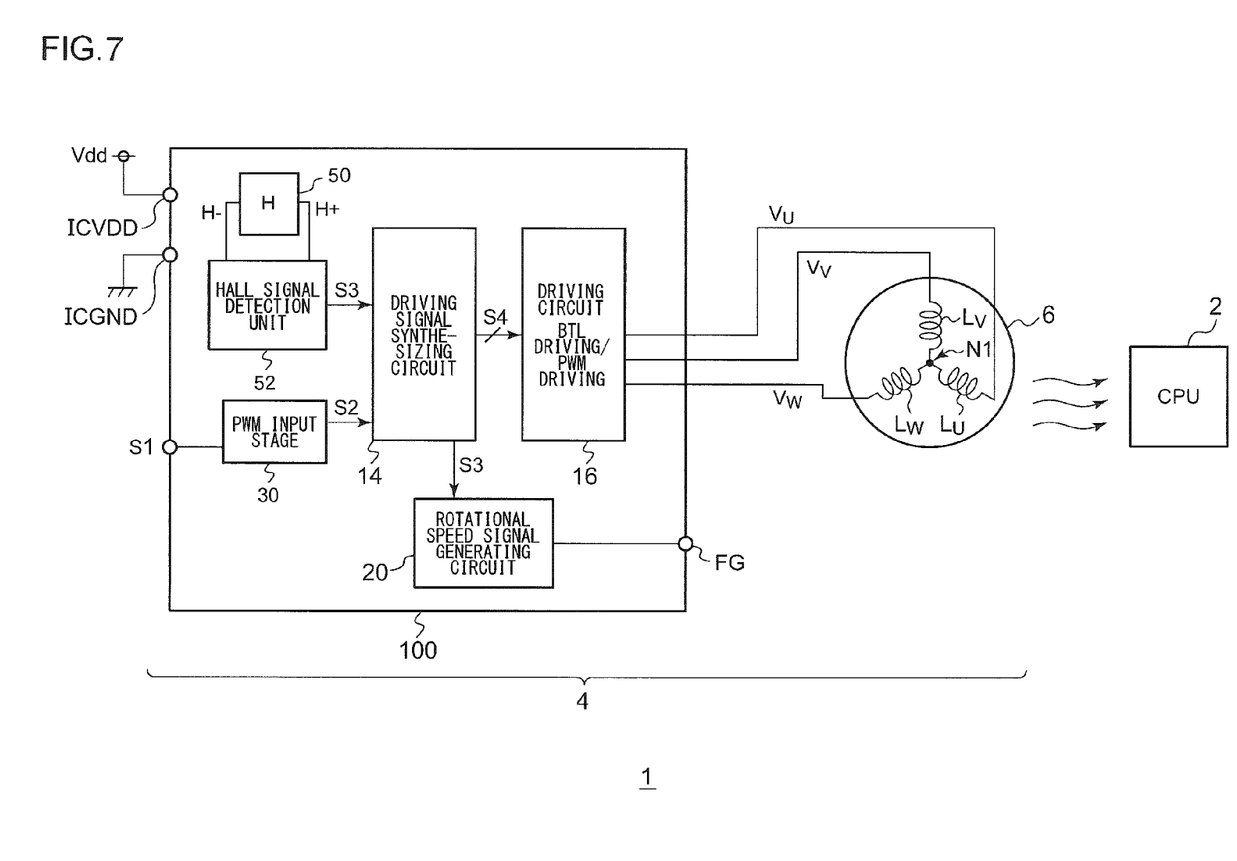
FIG. 7 is a circuit diagram showing a configuration of a driving apparatus according to a second modification.

FIG. 7 is a circuit diagram showing a configuration of a driving apparatus 100 according to a second modification.

The driving apparatus 100 includes a Hall element 50 and a Hall signal detection unit 52, instead of the BEMF detection circuit 10 shown in FIG. 3. The Hall element 50 is configured to generate a Hall signal that corresponds to the position of the rotor of the fan motor 6. The Hall signal detection unit 52 is configured to make a comparison between the Hall signal components H+ and H−, or otherwise to amplify the difference between them, so as to generate the rotation detection signal S3.

With such a fan motor having such a sensor using such a Hall element, such an arrangement also provides an advantage of reduced acoustic noise. It should be noted that the Hall element may be connected to the driving apparatus 100 as an external component.

Third Modification

Description has been made in the embodiment regarding an arrangement in which the control signal S1 subjected to pulse width modulation is input to the driving apparatus 100. However, the present invention is not restricted to such an arrangement. The control signal S1 may be configured as an analog voltage which indicates the torque target value. In this case, a pulse width modulator configured to perform pulse width modulation of an analog voltage may preferably be arranged as an upstream stage of the PWM input stage 12. For example, such a pulse width modulator may be configured using an oscillator configured to generate a cyclic voltage having a sawtooth waveform or otherwise a triangle waveform and a comparator configured to compare an analog voltage with a cyclic voltage.

Fourth Modification

The sampling circuit 34 of the PWM input stage 30 may be configured to be capable of switching the strobe signal between a strobe signal S11 that is asynchronous with respect to the cycle of the control signal S1 and a strobe signal that is generated synchronously with respect to the cycle of the control signal S1 as shown in FIG. 2.

In a usage in which the user desires to reduce acoustic noise, such a modification allows the user to employ the strobe signal S11 which is generated asynchronously with respect to the cycle of the control signal S1. Furthermore, when the user desires to stabilize the torque, such a modification allows the user to employ the strobe signal which is generated synchronously with respect to the cycle of the control signal S1.

Description has been made in the embodiment regarding an arrangement in which the cooling apparatus 4 mounted on an electronic device is configured to cool a CPU. However, the usage of the present invention is not restricted to such an arrangement. Rather, the present invention is applicable to various kinds of applications configured to cool a heated component. Furthermore, the usage of the driving apparatus 100 according to the embodiment is not restricted to the driving of a fan motor. Also, the present invention is applicable to the driving of various kinds of electric motors.

While the preferred embodiments of the present invention have been described using specific terms, such description is for illustrative purposes only, and it is to be understood that changes and variations may be made without departing from the spirit or scope of the appended claims.

What is claimed is:

1. A driving apparatus for a fan motor, comprising:
   a digital filter configured to convert, into a digital value, a duty ratio of a control signal which is pulse width modulated according to a target torque to be set for a fan motor to be driven;
   a sampling circuit configured to perform sampling of an output value of the digital filter at a sampling timing that is asynchronous with respect to a cycle of the control signal, so as to generate a torque instruction value; and
   a driving circuit configured to drive the fan motor according to the torque instruction value.

2. The driving apparatus according to claim 1, wherein a timing at which the sampling circuit updates the torque instruction value corresponds to a zero-crossing point of the fan motor.

3. The driving apparatus according to claim 1, wherein, when the sampling circuit performs sampling of the output value of the digital filter, the sampling circuit immediately updates the torque instruction value.

4. The driving apparatus according to claim 1, wherein the sampling circuit is configured to perform sampling of the output value of the digital filter according to a zero-crossing point of the fan motor, so as to update the torque instruction value.

5. The driving apparatus according to claim 1, wherein the sampling circuit is configured to perform sampling of the output value of the digital filter for every predetermined electrical angle of the rotation of the fan motor, so as to update the torque instruction value.

6. The driving apparatus according to claim 1, wherein the sampling timing at which the output value of the digital filter is sampled differs from an update timing at which the torque instruction value is updated.

7. The driving apparatus according to claim 1, configured such that it is monolithically integrated on a single semiconductor substrate.

8. A cooling apparatus comprising:
   a fan motor; and
   the motor driving apparatus according to claim 1, configured to drive the fan motor.

9. An electronic device comprising the cooling apparatus according to claim 8.

10. A driving method for a fan motor, the driving method comprises:
    generating a control signal which is pulse width modulated according to a target torque to be set for the fan motor;
    smoothing the control signal by means of a digital filter;
    sampling an output value of the digital filter at a sampling timing that is asynchronous with respect to a cycle of the control signal, so as to generate a torque instruction value; and
    driving the fan motor according to the torque instruction value.

11. The driving method according to claim 10, wherein a timing at which the torque instruction value is updated corresponds to a zero-crossing point of the fan motor.

12. The driving method according to claim 10, wherein, when the output value of the digital filter is sampled, the torque instruction value is immediately updated.

13. The driving method according to claim 10, wherein the output value of the digital filter is sampled according to a zero-crossing point of the fan motor, so as to update the torque instruction value.

14. The driving method according to claim 10, wherein the output value of the digital filter is sampled for every predetermined electrical angle of the rotation of the fan motor, so as to update the torque instruction value.

* * * * *